(12) United States Patent
Poore et al.

(10) Patent No.: US 7,224,146 B2
(45) Date of Patent: May 29, 2007

(54) DUAL VOLTAGE ELECTRICAL SYSTEM

(75) Inventors: Bernard Brandt Poore, East Moline, IL (US); Robert Eugene Kasten, Denver, CO (US)

(73) Assignee: Deere & Company, Moline, IL (US)

( * ) Notice: Subject to any disclaimer, the term of this patent is extended or adjusted under 35 U.S.C. 154(b) by 62 days.

(21) Appl. No.: 11/245,290

(22) Filed: Oct. 6, 2005

(65) Prior Publication Data

US 2007/0080669 A1   Apr. 12, 2007

(51) Int. Cl.
*H02P 9/44* (2006.01)
(52) U.S. Cl. .......................... 322/28; 322/90
(58) Field of Classification Search .............. 322/22, 322/23, 24, 25, 28, 46, 89, 90
See application file for complete search history.

(56) References Cited

U.S. PATENT DOCUMENTS

| | | | | |
|---|---|---|---|---|
| 3,793,544 A | * | 2/1974 | Baumgartner et al. ...... | 320/123 |
| 3,863,127 A | | 1/1975 | Raver .......................... | 320/15 |
| 4,492,912 A | | 1/1985 | Nowakowski ................ | 320/6 |
| 4,539,515 A | * | 9/1985 | Morishita et al. ........... | 320/123 |
| 4,684,814 A | | 8/1987 | Radomski .................... | 290/31 |
| 4,686,442 A | | 8/1987 | Radomski .................... | 320/17 |
| 4,692,684 A | | 9/1987 | Schaeffer .................... | 322/28 |
| 4,720,645 A | | 1/1988 | Stroud ......................... | 310/68 |
| 4,743,830 A | | 5/1988 | Lakey .......................... | 320/6 |
| 4,748,395 A | | 5/1988 | Reynolds .................... | 320/17 |
| 4,788,486 A | * | 11/1988 | Mashino et al. ............ | 320/123 |
| 4,803,376 A | | 2/1989 | N'Guyen .................... | 290/22 |
| 4,883,973 A | | 11/1989 | Lakey et al. ................ | 290/31 |
| 4,948,997 A | | 8/1990 | Ohmitsu et al. ............. | 310/23 |
| 4,967,096 A | | 10/1990 | Diemer et al. ............... | 307/19 |
| 4,985,670 A | | 1/1991 | Kaneyuki et al. ........... | 322/28 |
| 4,999,563 A | * | 3/1991 | Suzuki ......................... | 322/90 |
| 5,021,727 A | | 6/1991 | Mashino ...................... | 322/7 |
| 5,028,803 A | | 7/1991 | Reynolds .................... | 290/31 |
| 5,059,886 A | | 10/1991 | Nishimura et al. .......... | 322/28 |
| 5,086,266 A | | 2/1992 | Shiga et al. ................. | 322/28 |
| 5,166,538 A | | 11/1992 | Norton ........................ | 301/10.1 |
| 5,245,267 A | * | 9/1993 | Pierret et al. ............... | 320/119 |
| 5,323,102 A | | 6/1994 | Torii et al. .................. | 322/90 |
| 5,416,401 A | | 5/1995 | Neuhaus ..................... | 320/15 |
| 5,512,811 A | | 4/1996 | Latos et al. ................. | 322/10 |
| 5,764,036 A | * | 6/1998 | Vaidya et al. ............... | 322/90 |
| 6,008,545 A | | 12/1999 | Nagano et al. .............. | 290/46 |
| 6,275,012 B1 | * | 8/2001 | Jabaji ........................... | 322/22 |
| 6,291,902 B1 | | 9/2001 | Ogane et al. ................ | 290/34 |
| 6,373,230 B2 | * | 4/2002 | Jabaji ........................... | 322/28 |
| 6,456,514 B1 | * | 9/2002 | Perreault et al. ............ | 363/89 |
| 7,034,509 B2 | * | 4/2006 | Kusko ......................... | 322/90 |

\* cited by examiner

*Primary Examiner*—Nicholas Ponomarenko

(57) ABSTRACT

A dual voltage supply system supplies high and low voltage electrical power to separate high and low voltage loads. The system includes an AC alternator and first and second rectifier circuits, each connected to the alternator and a corresponding high and low voltage load. The first rectifier circuit commutates the alternator voltage to the high voltage load when the alternator voltage is higher than a voltage of the high voltage load. The second rectifier circuit commutates the alternator voltage to the low voltage load when the alternator voltage is higher than a voltage of the low voltage load and less than some maximum voltage which is less than the maximum voltage that can be tolerated by the low voltage load(s). The second rectifier circuit is turned off whenever the first rectifier circuit is turned on.

5 Claims, 3 Drawing Sheets

DUAL VOLTAGE ELECTRICAL SYSTEM

BACKGROUND

The present invention relates to a dual voltage electrical system for a vehicle.

Future agricultural and industrial tractors are expected to use higher power electrical auxiliaries to supplement or replace mechanical and hydraulic auxiliaries currently used. For example: electric power steering systems, electric air conditioners, and high voltage/high power xenon lighting systems are just a few of the higher power electrical auxiliaries under evaluation. These systems use higher power than the majority of electrical auxiliaries now in use, and could be implemented more economically and efficiently if they operated at higher voltages (and correspondingly lower currents). To this end, 42 volt automotive electrical components are under development, and in the near future, even higher voltage DC busses will likely be developed.

Since the battery, starter motor, and many low power electrical auxiliaries still require electrical power at the battery voltage, some efficient, inexpensive means to provide electrical power to both a high voltage bus and the lower voltage battery is required. Separate high and low voltage generator/alternators could be used. Separate, high and low voltage windings on the generator/alternator are also known. DC—DC converters to convert power at one voltage level to another are well known. All of these alternatives are expensive.

SUMMARY

Accordingly, an object of this invention is to provide an electrical system which provides dual voltages from a single alternator.

This and other objects are achieved by the present invention, wherein a dual voltage supply system supplies high and low voltage electrical power to separate high and low voltage loads. The system includes an AC alternator and first and second rectifier circuits, each connected between the alternator and a corresponding high and low voltage load. The first rectifier circuit commutates the alternator output voltage to the high voltage load when the alternator voltage is higher than the voltage of the high voltage load. The second rectifier circuit commutates the alternator to the low voltage load when the alternator voltage is higher than the voltage of the low voltage load and less than either the voltage of the high voltage load or a maximum voltage that is less than the maximum voltage that can be applied without damage to the low voltage load, whichever is lower. The second rectifier circuit is turned off whenever the first rectifier circuit is turned on. Each of the first and second rectifier circuits includes a plurality of power switches connected between the alternator and one of the loads, a plurality of switch drivers, each driving a corresponding one of the power switches, and a phase controlled rectifier controller controlling the switch drivers. This dual voltage system provides a cost effective system for supplying dual voltages from a single electrical alternator.

DETAILED DESCRIPTION

Figure 1A:
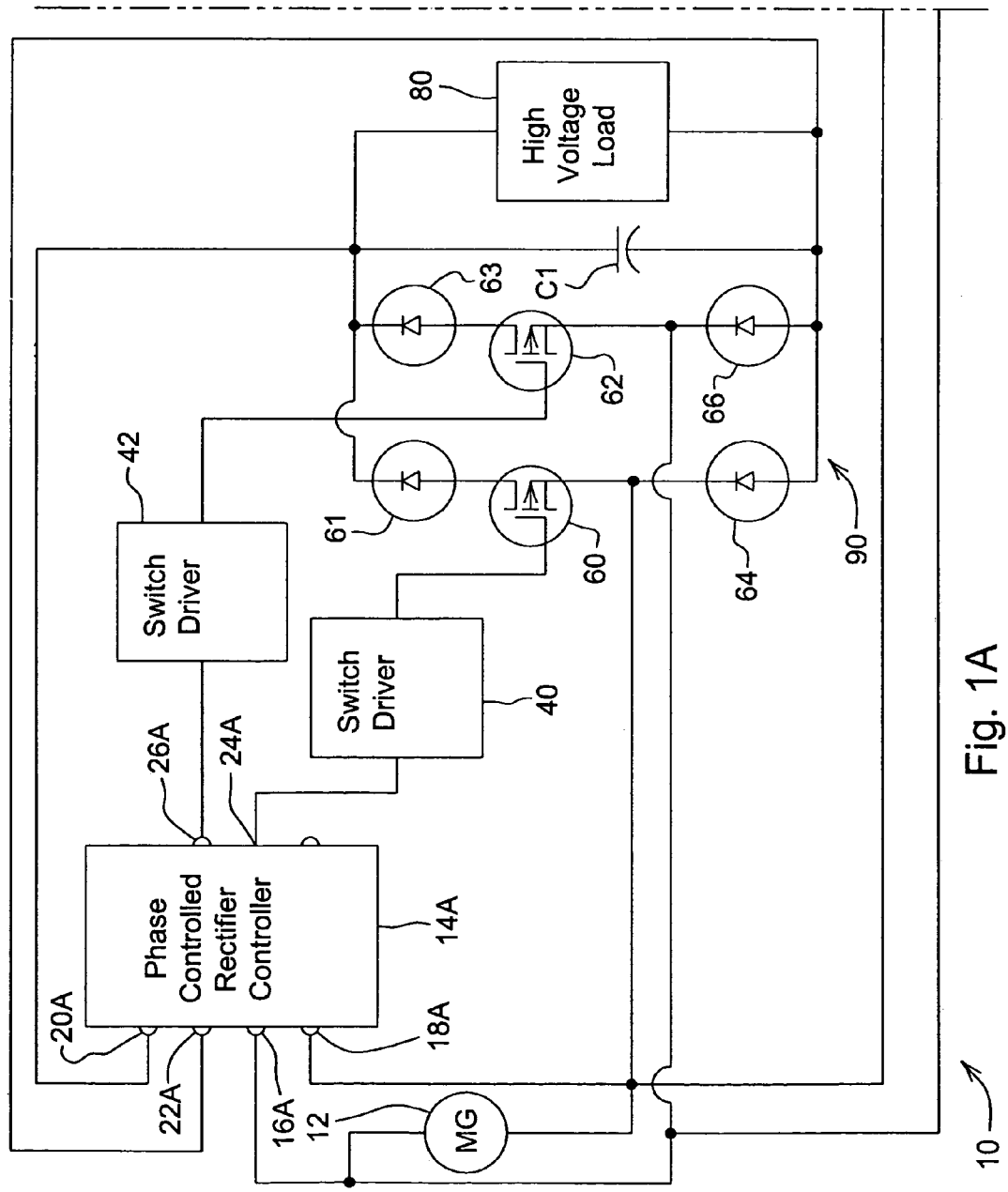
FIGS. 1A and 1B combine to form a schematic circuit diagram of a dual voltage electrical system with a single phase alternator and using power mosfets as the power switches.
Figure 1B:
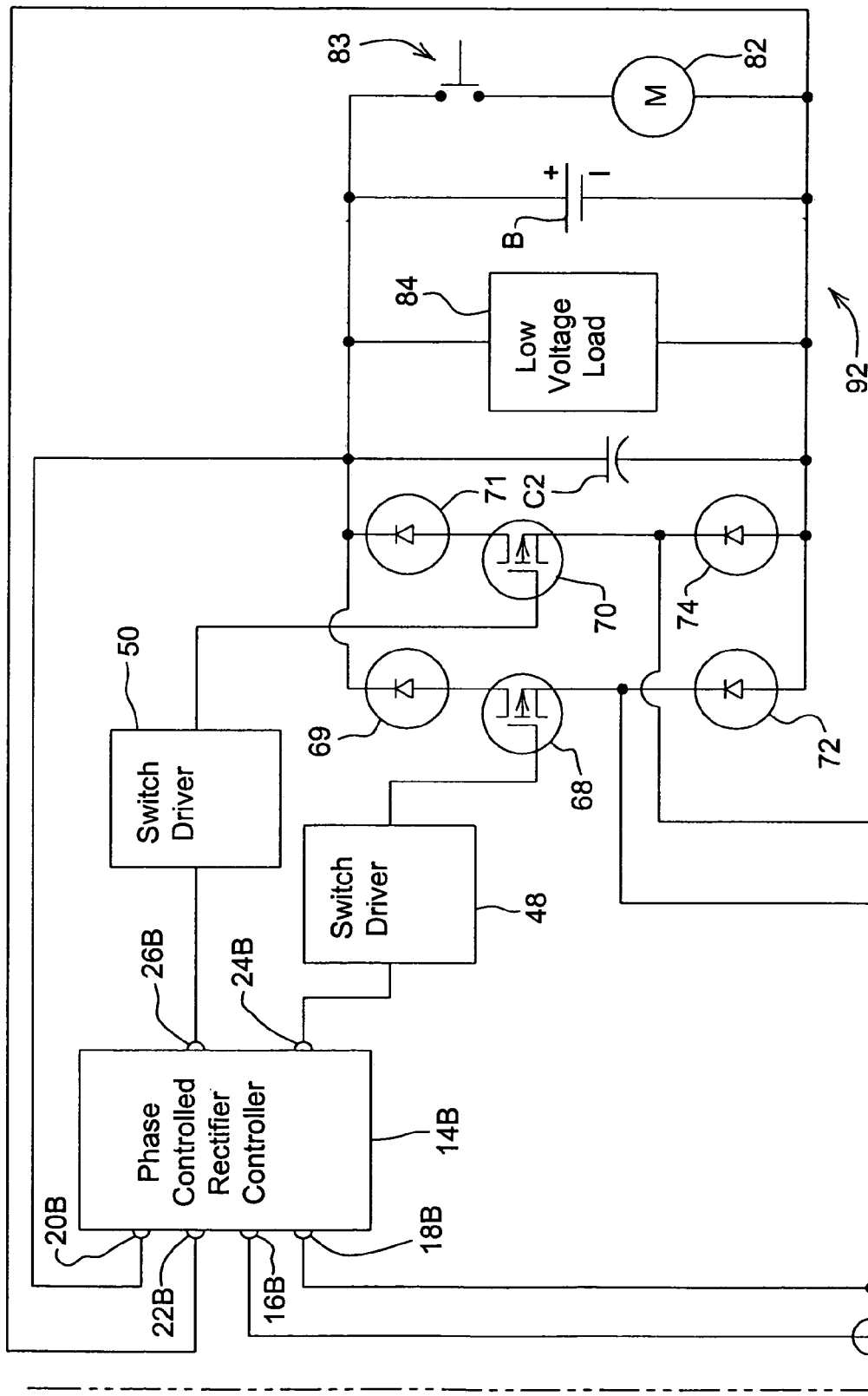

Referring to FIG. 1, the electrical system 10 includes an engine driven AC alternator 12 which generates an alternating current at a voltage such as 60 volts for a 42 volt high voltage load or perhaps 800 volts for a 600 volt high voltage load. The system 10 also includes a first or high voltage phase controlled rectifier controller 14A and a second or low voltage phase controlled rectifier controller 14B. Each of these rectifiers functions as a single phase semi-converters as described for example in chapter 4 of *Power Electronics* by Rashid. Rectifier controller 14A includes inputs 16A–22A and outputs 24A and 26A. Rectifier controller 14B includes inputs 16B–22B and outputs 24B and 26B. The system 10 also includes switch drivers 40, 42, 48 and 50, and power switches 60, 62, 68 and 70. Associated with each of the power switches is a series connected blocking diode 61, 63, 69 and 71, which are required when power mosfets or IGBT's are used as power switches. Power mosfets and IGBT's have an inherent parallel diode that would connect the rectified output bus to the source and allow current to flow back to the alternator and discharge the capacitor when the alternator voltage dropped below the bus voltage. Diodes 61, 63, 69 and 71 block this current. Diodes 64, 66, 72 and 74 connected between the high or low voltage loads and the alternator complete the circuit.

The system also includes a high voltage capacitor C1 and is connected to a high voltage load(s) 80. The high voltage load(s) 80 may include electrical devices such as an electric motor (not shown) driving an air conditioner compressor, a motor (not shown) driving a vehicle auxiliary function, an electric powered hydraulic system (not shown), a wheel drive motor (not shown) and/or high voltage lights (not shown). For low voltage applications (maximum voltage less than approximately 100 volts) power switches 60–70 are preferably commercially available MOSFET devices such as Maxim part # MAX620 or Micrel part # MIC4100 or National Semiconductor part # LMS5102, or any other suitable equivalent. For voltages greater than 100 volts IGBT devices such as International Rectifier part # IR2184 or equivalent could be used as power switches 60, 62, 68 and 70.

The system 10 is also connected to a conventional starter motor 82 and starter solenoid 83, a low voltage capacitor C2, a battery B and a low voltage load(s) 84. The low voltage load(s) 84 may include electrical devices such as a radio, a microcontroller(s), low voltage lighting, low voltage electric fan motors, etc.

The first side of the alternator 12 is connected to input 16A of first or high voltage phase controlled rectifier controller 14A and to input 16B of the second or low voltage phase controlled rectifier controller 14B. The second side of the alternator 12 is connected to input 18A of rectifier controller 14A and to a input 18B of the rectifier controller 14B. The first side of alternator 12 is also connected to power switches 60 and 68 and diodes 64 and 72. The second side of alternator 12 is also connected to power switches 62 and 70 and diodes 66 and 74.

One of the switch driver circuits 40 and 42 is connected between a corresponding output of the rectifier controllers 14A and a corresponding one of the power switches 60 and 62. The drain terminals of power switches 60 and 62 are connected to one side of the high voltage load 80 and capacitor C1 through blocking diodes 61 and 63. The anodes of diodes 64 and 66 are connected to the other side of high voltage load 80 and capacitor C1.

One of the switch driver circuits 48 and 50 is connected between a corresponding output of the rectifier controllers 14B and a corresponding one of the power switches 68 and 70. The drain terminals of power switches 68 and 70 are connected to one side of the low voltage load 84 through blocking diodes 69 and 71. The anodes of blocking diodes 72 and 74 are connected to the other side of high voltage load 84. Battery B, capacitor C2, and series connected starter solenoid 83 and starter motor 82 are connected in parallel with low voltage loads 84.

The switch driver circuits 40–50 convert logic level outputs from the rectifier controllers 14A–B to the voltage levels required to turn the power switches 60,62, 68 and 70 on or off.

As a result, rectifier controller 14A, driver circuits 40 and 42, and power switches 60 and 62, and diodes 61,63, 64 and 66 form a high voltage rectifier circuit 90, while rectifier controller 14B, driver circuits 48 and 50, and power switches 68 and 70, and diodes 69,71,72 and 74 form a low voltage rectifier circuit 92.

Rectifier controller 14A is programmed to turn on during maximum amplitude portions of the voltage produced by generator alternator 12. Voltage regulation is achieved by rectifier controller 14A selecting the phase angle at which the power switches are turned on. Rectifier controller 14A turns off the power switches when the magnitude of the AC voltage from alternator 12 is less than the voltage across C1, or, if silicon controlled rectifiers are used as the power switches, they self commutate when the alternator voltage drops below the bus voltage. If power mosfets or IGBT's are used as the power switches, the rectifier controller can pulse width modulate to regulate the current. Rectifier controller 14B is programmed to turn on during lower amplitude portions of the voltage produced by alternator 12. The turn on point must occur when the magnitude of the AC voltage is greater than the low voltage bus voltage, but lower than the maximum voltage that can be applied without damaging the low voltage load. Voltage regulation is achieved by rectifier controller 14B selecting the phase angle at which the low voltage switches are turned on. Rectifier controller 14B turns off the power switches when the magnitude of the AC voltage from generator 12 is less than the voltage across C2, or, if silicon controlled rectifiers are used as the power switches, they self commutate when the alternator voltage drops below the bus voltage. If power mosfets or IGBT's are used as the power switches, the rectifier controller can pulse width modulate to regulate the current. If self commutating silicon controlled rectifiers are used as the power switches, they can only be turned on during the portion of the cycle when the alternator voltage is falling, while other switches can be also be turned on and off during the portion of the cycle when the alternator voltage is rising. This would permit a higher current low voltage load to be powered by this circuit. As a result, the switches 60–62 operate to apply higher voltage signals to the high voltage load 80, while the switches 68–70 operate to apply a lower voltage to the low voltage loads 84 and to the starter motor 82 (when switch 83 is closed).

Although the switches in FIG. 1 are shown as power mosfets (in series with blocking diodes), silicon controlled rectifiers (SCRs), BJT transistors, darlington transistors, power mosfets, or IGBTs could be used depending on cost and design considerations. Because of the inherent diode present in power mosfets or IGBTs, a series diode must be placed in series with these devices to block current flow when the source generator voltage drops below the low or high voltage DC bus voltage. Note that the low voltage rectifier switches would have to withstand essentially the same voltage as the high voltage rectifier switches.

Figure 2:
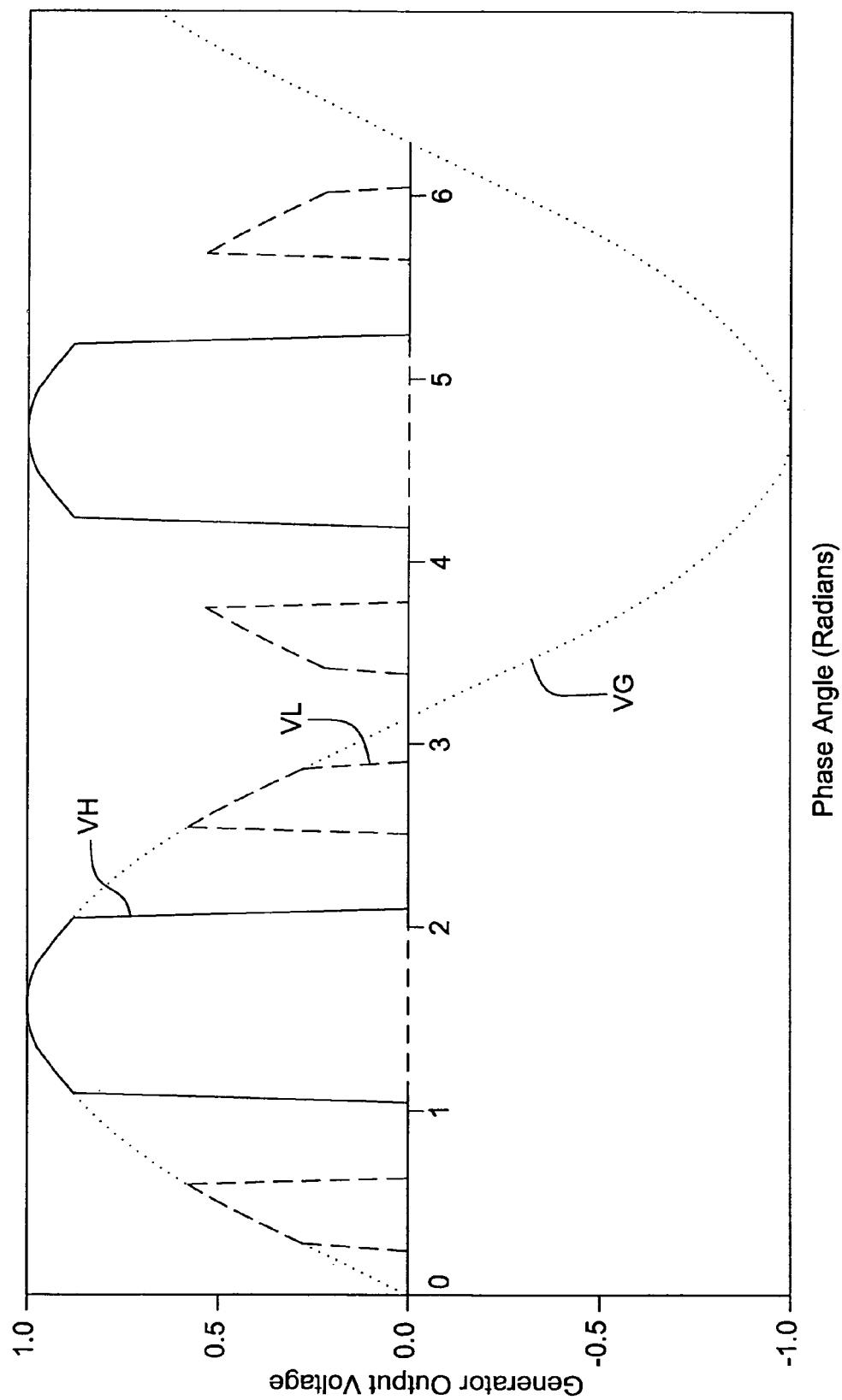
FIG. 2 is a signal timing diagram illustrating the operation of the rectifiers of the circuit of FIG. 1.

Referring now to FIG. 2, this FIG. 2 shows the voltage output VG of the AC generator alternator 12 for one complete cycle. Superimposed thereon is the voltage output VH of the high voltage rectifier circuit 90 and voltage output VL of the low voltage rectifier circuit 92.

The result is a low cost, phase controlled dual rectifier system where both rectifiers circuits 90 and 92 are connected to the output of a single AC electrical generator alternator 12. Each of the phase controlled rectifier circuits operates to connect the generator alternator 12 to different loads for different portions of the cycle when its output voltage is greater than the corresponding load voltage. The low voltage rectifier controller 14B is programmed or controlled so that it will be off at any time the voltage output of the generator alternator 12 is high enough to cause damage to the low voltage loads 84. As a result, this system is best applied in applications where the average low voltage power is small compared to the total electrical power output of the generator alternator. The battery B allows the low voltage circuit to provide high power to the low voltage loads such as the starter motor for a short time.

As an alternative, the power switches in the low voltage rectifier circuit 92 could be implemented with silicon-controlled rectifiers SCR's. Since SCR's only turn off when the voltage drop across them reaches zero, they can only be turned on only when the amplitude of the generator alternator voltage waveform is decreasing, and would be automatically shut off when the alternator voltage equaled or dropped below the load voltage.

Other high power switching devices such as BJT transistors, Darlington transistors, GTO's, IGBT's or Power Mosfets could be used on both the rising and falling portion of the alternator voltage wave form. The choice of power transistor depends on voltage, current levels, circuit complexity and cost considerations.

The low voltage (battery bus voltage) from battery B is used to power the starter motor 82 to start the internal combustion engine (not shown). After the engine is running, the low voltage starter motor 82 is automatically disconnected from the alternator and the alternator voltage rises to a level determined by the operating speed of the engine and/or the field control circuit of the alternator (not shown), and a large amount of electrical power is available to power high voltage loads and auxiliary systems at a high bus voltage. While the present invention has been described in conjunction with a specific embodiment, it is understood that many alternatives, modifications and variations will be apparent to those skilled in the art in light of the foregoing description. For example, a 3-phase version of the present invention could be implemented by a circuit which included 3 parallel single phase circuits, one for each of the 3 phases. Accordingly, this invention is intended to embrace all such alternatives, modifications and variations which fall within the spirit and scope of the appended claims.

We claim:

1. A dual voltage supply system for supplying high and low voltage electrical power to separate high and low voltage loads, comprising:
   an AC generator alternator;
   a first rectifier circuit connected between the alternator and the high voltage load, the first rectifier circuit connecting the alternator output to the high voltage load when the alternator voltage is higher than a voltage of the high voltage load;

a second rectifier circuit connected between the alternator and the low voltage load, the second rectifier circuit connecting the generator alternator to the low voltage load when the generator alternator voltage is higher than a voltage of the low voltage load and less than some maximum voltage which is less than the maximum voltage that can be tolerated by the low voltage load(s).

2. The dual voltage supply system of claim 1, wherein:
the second rectifier circuit is turned off whenever the first rectifier circuit is turned on.

3. The dual voltage supply system of claim 1, wherein each of the first and second rectifier circuits comprises:
   a plurality of power switches connected between the generator alternator and one of the loads;
   a plurality of switch drivers, each driving a corresponding one of the power switches; and
   a phase controlled rectifier controller controlling the switch drivers.

4. A dual voltage supply system for supplying high and low voltage electrical power to separate high and low voltage loads, comprising:
   an AC generator alternator;
   a first rectifier circuit connected to the generator alternator and to the high voltage load, the first rectifier circuit comprising a plurality of first power switches connected between the generator alternator and one of the loads, a plurality of first switch drivers, each driving a corresponding one of the power switches, and a first phase controlled rectifier controller controlling the first switch drivers so that the first rectifier circuit connects the alternator to the high voltage load when the alternator voltage is higher than the voltage of the high voltage load;

a second rectifier circuit connected between the alternator and the low voltage load(s), the second rectifier circuit comprising a plurality of second power switches connected between the alternator and the low voltage load(s), a plurality of second switch drivers, each driving a corresponding one of the second power switches, and a second phase controlled rectifier controller controlling the second switch drivers so that the second rectifier circuit connects the alternator to the low voltage load(s) when the alternator voltage is higher than the voltage of the low voltage load(s) and less than some maximum voltage which is less than the maximum voltage that can be tolerated by the low voltage load(s).

5. The dual voltage supply system of claim 4, wherein:
the second rectifier circuit is turned off whenever the first rectifier circuit is turned on.

* * * * *